United States Patent [19]
Fox

[11] Patent Number: 5,259,931
[45] Date of Patent: Nov. 9, 1993

[54] STRIPPING TOWER SYSTEM FOR REMOVING VOLATILE COMPONENTS FROM WATER CONTAINING THE SAME

[76] Inventor: James R. Fox, 8737 Heathwood Bend, Knoxville, Tenn. 37923

[21] Appl. No.: 829,229

[22] Filed: Feb. 3, 1992

[51] Int. Cl.$^5$ .......................... B01D 1/16; B01D 3/00
[52] U.S. Cl. ........................................ 202/83; 55/227; 55/229; 55/233; 159/4.04; 159/44; 159/901; 159/DIG. 40; 202/158; 202/181; 202/236; 203/1; 203/14; 203/49; 203/90; 203/98; 203/DIG. 18; 210/104; 210/150; 261/26; 261/27; 261/96; 261/98
[58] Field of Search ................. 202/83, 236, 158, 181, 202/262; 210/188, 104, 150; 203/98, 14, 90, 1, 49, DIG. 18; 159/44, DIG. 40, 901, 4.04; 55/227, 233, 229; 261/27, 26, 96, 98

[56] References Cited
U.S. PATENT DOCUMENTS

| 3,595,536 | 7/1971 | Ripley | 261/111 |
| 4,460,552 | 7/1984 | Zakrzewski | 261/98 |
| 4,508,545 | 4/1985 | De Loach | 210/718 |
| 4,713,172 | 12/1987 | Horn et al. | 210/150 |
| 4,738,695 | 4/1988 | Carr et al. | 55/229 |
| 4,764,272 | 8/1988 | Fox | 210/104 |
| 4,844,795 | 7/1989 | Halwani | 210/188 |
| 4,968,336 | 11/1990 | Reimanis et al. | 55/233 |
| 5,069,796 | 12/1991 | Fox | 210/664 |
| 5,092,959 | 3/1992 | Orii et al. | 159/44 |
| 5,116,515 | 5/1992 | Selesnick | 210/110 |

Primary Examiner—Virginia Manoharan
Attorney, Agent, or Firm—Pitts & Brittian

[57] ABSTRACT

A system for removing volatile constituents (e.g., hydrocarbons) from a liquid (e.g., water) containing the same by which there is a continuous countercurrent contact between the liquid and a forced air flow. Water collected in a reservoir is continuously pumped to the top of a stripping tower where it is dispersed downwardly over packing material. A blower forces air upwardly in the tower so as to remove the volatile constituents that exit the tower with the exit air. Since the water flow is continuous, multiple passes occur through the tower to enhance separation efficiency. Water from the base of the tower returns to the reservoir via overflow from a standpipe. A lower liquid level sensor in the reservoir initiates operation of the water pump to the tower, and an upper liquid level sensor initiates operations of another pump for pressure discharge from the base of the tower to an exterior site. There is a security enclosure to prevent unauthorized access with this enclosure being mounted on a support base for supporting the other components.

3 Claims, 2 Drawing Sheets

STRIPPING TOWER SYSTEM FOR REMOVING VOLATILE COMPONENTS FROM WATER CONTAINING THE SAME

TECHNICAL FIELD

This invention relates generally to the removal of volatile components from a liquid containing the same, and more particularly to a stripping tower system using forced air flow to remove volatile hydrocarbon components and the like from water. The system provides for multi-pass through the stripping tower, and level controls govern operation including external disposition of treated water.

BACKGROUND ART

Discussed in my U.S. Pat. No. 4,764,272, entitled "Apparatus for Recovery of Hydrocarbons from Hydrocarbon/Water Mixtures", issued on Aug. 16, 1988, is apparatus for processing water from various sources where there is a major contamination of the water with hydrocarbons. These hydrocarbon contaminants can be either dissolved in, or mixed with, the water.

Then in my U.S. Pat. No. 5,069,796, entitled "System for Removing Volatile Components from Water Derived from Wells", issued Dec. 3, 1991, a system is discussed which is useful to process water that is less contaminated with hydrocarbons.

The systems of both of these patents utilize a stripping tower wherein there is countercurrent flow of forced air and a liquid containing the volatile components such that the volatile components are stripped from the liquid. In the '272 patent liquid product, after gross separation by gravity action, is collected in a generally open pan. This collected water is then picked up for a single pass of the liquid/volatiles mixture through a stripping tower where the mixture is passed countercurrently to forced air flow. The "processed" water is collected in the base of the tower. In the '796 patent the liquid (water) with the volatile contaminants is pumped directly into a similar stripping tower, with the processed water again being collected in the base of the stripping tower. In both patents the towers are operated intermittently when there is a demand with the water passing through the tower a single time, and in both the processed water is discharged from the systems by gravity when the quantity thereof exceeds an amount as determined by liquid level sensors in the respective collection devices.

During the continued use of the system of the '272 patent it has been found that often the quantity of initially processed water is relatively small that enters the collection pan from which it is to be pumped to the stripping tower. Thus, the stripping tower is only occasionally utilized and the pump associated therewith is often idle. As a result, since the system is usually at a remote site, there is increased potential for failure when the pump and tower are to be used. Further, if there is no contact for stripping the volatiles, they may remain within the water in the pan particularly since the amount of the volatiles can vary over wide ranges. In addition, there is always a potential problem of freezing of the water and thus damage to the equipment.

Accordingly, it is an object of the present invention to provide a stripping tower system that more efficiently removes volatile components, such as volatile hydrocarbons, from water containing the same.

It is another object of the present invention to provide a stripping tower system for the processing of water containing volatile components to remove these volatiles by contact with forced air wherein the stripping tower is continuously operated under all conditions of feed of the contaminated water whereby there are multiple passes of the water to enhance removal of the contaminants and reduce potential mechanical problems.

A further object of the present invention is to provide a stripping tower system for the separation of volatiles from a liquid, and particularly water, where excess processed water is discharged under pressure so as to be conveyed a greater distance for ultimate disposal in a collection device or utilization for irrigation, etc.

These and other objects of the present invention will become more apparent upon a consideration of the detailed description that follows when read together with the drawings identified hereinafter.

DISCLOSURE OF THE INVENTION

In accordance with the present invention, there is provided a stripping tower system having a collection vessel to receive water that is to be processed for the removal of any volatile contaminants therein. A pumping means continuously removes a portion of the water from the collection vessel and conveys the same to a stripping tower where the contaminated water is passed countercurrently to forced air. The water, after passing through the tower, returns to the collection vessel by way of a reservoir in the base of the tower so that it can be again passed through the tower thereby giving rise to multiple passes to enhance the removal of the volatile contaminants. Liquid level means are associated with the collection vessel to insure a minimum level in the vessel, and identify a maximum level at which pressure discharge will occur. An air flow switch is provided in a preferred embodiment to de-energize all of the equipment if air flow fails for any reason. Further, a security fence means is provided in the preferred embodiment.

BEST MODE FOR CARRYING OUT THE INVENTION

Figure 1:
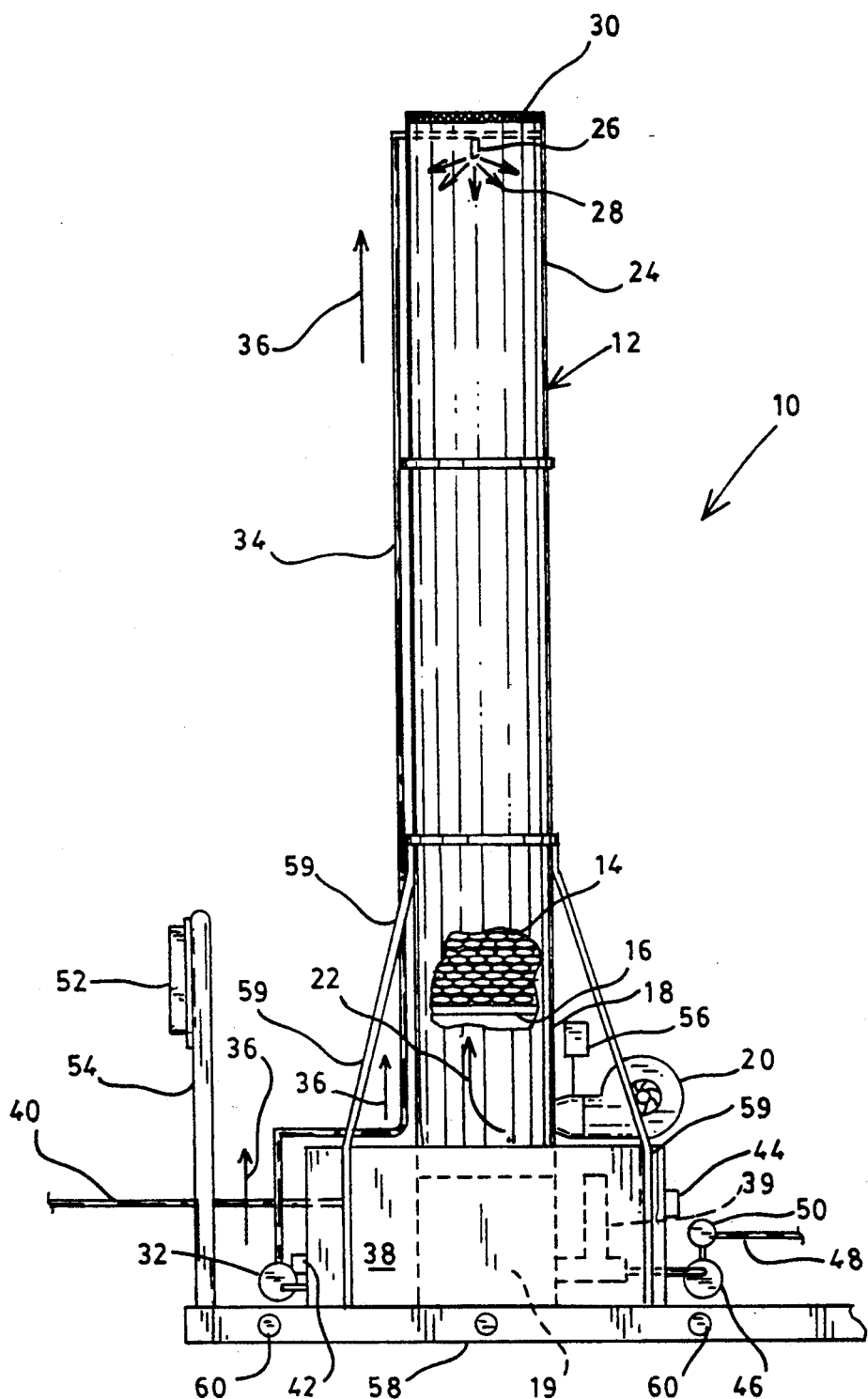
FIG. 1 is a schematic drawing depicting apparatus associated with the present invention.

A stripping tower system is illustrated generally at 10 in FIG. 1. The primary component of the system is a tower 12 containing a packing material 14 typically in the form of spheres supported on a distribution plate or screen 16 in the lower portion 18 of the tower 12. This lower portion 18 forms a reservoir 19 for the accumulation of water after passing through the tower 12. The plate or screen 16 receives air from a blower 20 that causes air upflow as indicated by the arrows 22. In the upper portion 24 of the tower 12 there is a liquid dispersing head 26 that causes downward liquid flow, as indicated by arrows 28, that is countercurrent to the air flow. A top screen 30 permits the escape of volatile materials that are separated from the liquid by the air flow and acts as a mist retainer. Liquid is fed to the dispensing head 26 by a pump 32 and piping 34 where the liquid flows according to the arrows 36. Of course, the piping 34 can be positioned within the tower 12 rather than being exterior.

Surrounding the lower portion 18 of the tower 12 is a base pan 38 that is normally open at the top; however, it can be closed if desired. Mounted within the pan 38 is a standpipe 39 that is connected to the tower reservoir 19 for purposes discussed hereinafter. While the pan 38 is illustrated as being concentric with the tower 12, this is for the purpose of providing a self-supporting unit and a minimization of dimensions of the system. Although not preferred, the pan 38 can be offset, with a discharge line being provided from the tower base reservoir to the pan 38. It is into this pan 38 that any contaminated liquid, e.g., water, is directed from any source. The source can be, for example, a pump (not shown) drawing contaminated water from a well (not shown). Typically this water flows in a direction indicated by arrow 40 at, but not limited to, about two to ten gallons per minute. The flow rate is dependent upon the particular source, of course. It is from this pan 38 that the pump 32 receives the liquid for transporting to the dispensing head 26.

The pan 38 contains at least two liquid level detection means. A first liquid level detection means 42 is positioned to initiate countercurrent flow of liquid and air when a minimum quantity of liquid is in the pan 38. The second liquid level detection means 44 is positioned such that if liquid in the pan 38 reaches this upper level, a discharge pump 46 is energized to cause pressurized disposal of the treated liquid from the tower reservoir 19 via a discharge pipe 48. This pipe 48 can lead to a remote collection tank or disposal site, or even to a spray distribution system for irrigation or the like. This discharge can be monitored, if desired, by a flow meter 50.

Operation of the system is achieved with a control module 52 as mounted on a support 54. This module 52 controls all of the pumps and blowers as determined by signals from the liquid level detection means 42, 44. In addition, a signal is derived from an air flow detector 56 such that if the blower 20 fails. This will cause shutdown of the entire system. While the control module 52 is preferably mounted with the other equipment, it will be understood that this control could originate from a remote location. Although not shown, typically the pan 38 is provided with a float switch near the rim thereof to prevent overflow.

Figure 2:
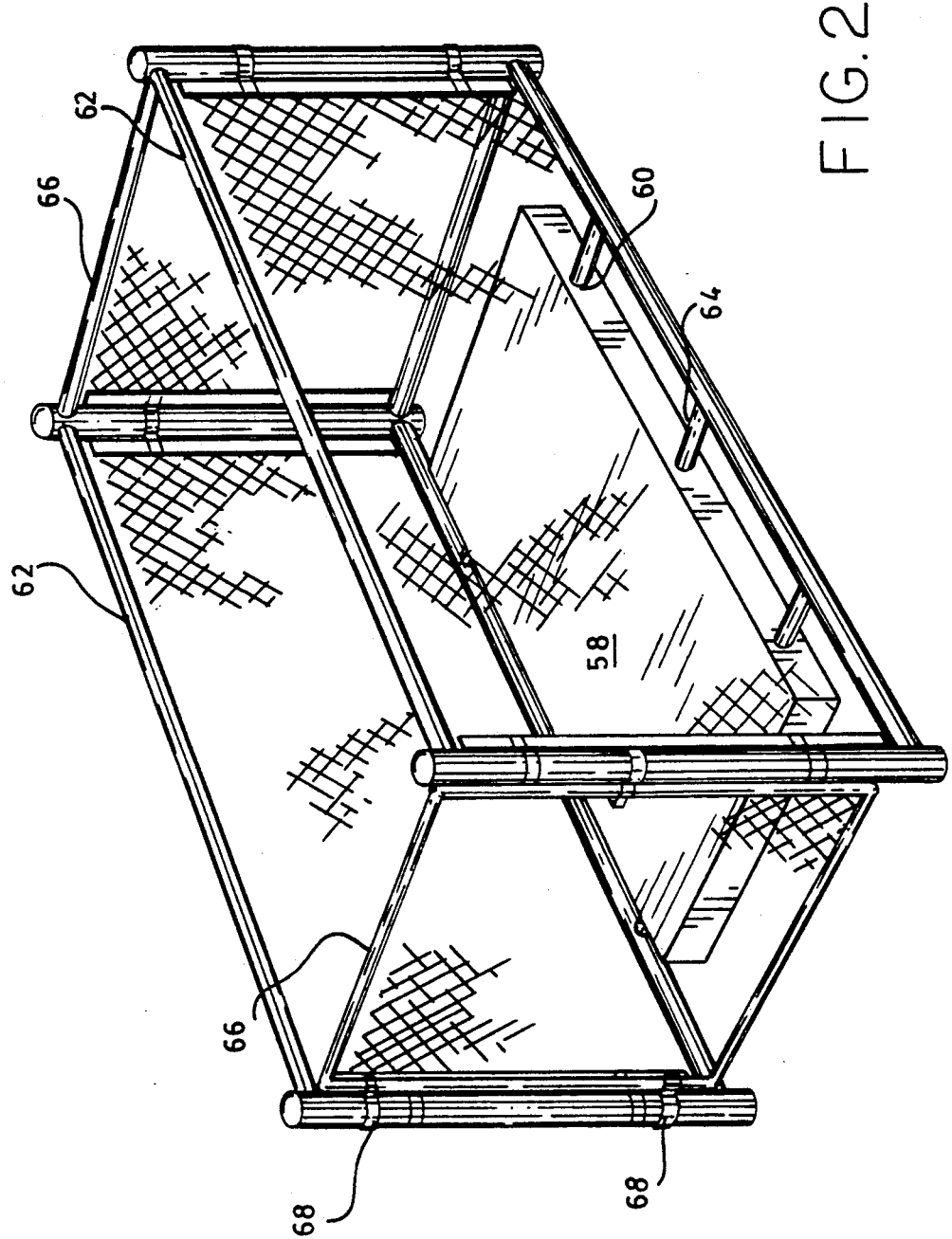
FIG. 2 is a drawing depicting the use of a security fencing to protect the apparatus of FIG. 1.

The entire system as described is mounted on a skid 58 or the equivalent for convenient transport to a remote site. Typically braces 59 are used to stabilize the tower 12 in addition to stabilization by the pan 38. This skid 58 typically is provided with transverse passageways 60. This facilitates, for example, the mounting of a security enclosure, such as fencing units, at the operational site that can be placed around the unit. This is accomplished by placing fencing units 62 having mounting legs 64 that fit within the passageways 60 of the skid 58 as illustrated in FIG. 2. The addition of end gates 66 (with hinges 68) at the site completes the security enclosure. It will be understood that a singular gate 66 can be used. In this figure none of the operating components are shown on the skid 58 in order to more clearly show the security enclosure provided by units 62 and 66.

In a normal operation of the present invention, operating components are mounted upon a skid 58 as in FIG. 1, and the assembly moved by any suitable means to an operating site. Normally the skid 58 and the equipment thereon, after site placement, are enclosed in a security enclosure formed of the fence sides 62 and end gate(s) 66. Contaminated water (for example) that is to be treated for the removal of volatile contaminants is introduced into the pan 38 by any suitable means, with a pump (not shown) being the most typical means. When the liquid level reaches the lower level detector 42, pump 32 is made operational through the control module 52. This causes water in the pan 38 to be pumped up to the head 26 where it then falls by gravity against an air stream produced by the blower 20. The flow rate to the head 26 is selected to be greater than the inflow of contaminated water into the pan 38 which is at a level above the upper level detector 44, to provide for the multiple passes through the tower 12. The packing material 14 within the tower 12 distributes the water for better air/water contact. Any volatiles removed in this contact exit the tower 12 with excess air through the screen 30, with the water falling into the tower base reservoir 19. When the treated water reaches the level of the standpipe 39, it spills into the pan 38 where it is again recirculated to the top 24 of the tower 12. This provides multiple passes through the tower 12 to enhance separation and disposal of the volatile components. Whenever the water level in the pan 38 reaches the upper level detector 44, the pump 46 is activated to provide forced removal of water from the tower base reservoir 19. This pump 46 typically discharges the processed water to a distant location for storage or reuse. It can also discharge the water to an irrigation system, for example.

From the foregoing it will be recognized that an improved system has been provided for the separation of volatile constituents from liquids, and particularly volatile hydrocarbon contaminants in water. This system provides for continuous circulation of the contaminated water through a tower countercurrent to air flow to enhance the removal of the volatile constituents. The system is particularly well suited for remote locations since continuous pump operation minimizes mechanical problems, and reduces potential freezing within either the pump or piping associated therewith. The pumping rate is selected so that normally water within a pan from which the water is pumped to the tower stays within a selected range of levels; however, when the upper level is exceeded, forced discharge is initiated. This permits conducting the water to more remote locations and/or use in irrigation systems.

While some specific illustrations are given, these are for the purpose of providing a typical example of the invention and not for the purpose of limiting the invention. Rather, the invention is to be limited only by the appended claims in combination with the description and any equivalents thereof.

I claim:

1. A system for the removal of volatile contaminants from a contaminated liquid containing the same, said system comprising:

a skid-type support base, said support base provided with transverse passageways;

a collector mounted on said support base for receiving said contaminated liquid at a first flow rate, said collector provided with an upper and a lower liquid level sensor;

a vertical stripping tower mounted on said support base concentrically with said collector, said stripping tower including a spray head in an upper end, said stripping tower containing internal packing, said stripping tower defining a tower base reservoir for receiving liquid after passing through said stripping tower, said tower base reservoir provided with an outlet proximate a bottom of said tower base reservoir;

a standpipe mounted within said collector, said standpipe having an inlet connected with said outlet of said tower base reservoir, and having an open outlet positioned at an elevation above said upper liquid level sensor whereby excess liquid in said tower base reservoir spills from said open outlet of said standpipe into said collector;

a pump connected to said collector and to said spray head for continuously pumping liquid from said collector to said spray head, when liquid in said collector is above said lower liquid level sensor, at a second flow rate greater than said first flow rate whereby liquid in said collector is repeatedly recycled through said stripping tower;

an air blower mounted adjacent said stripping tower and connected to said stripping tower, said air blower providing for air flow upwardly within said stripping tower countercurrent to liquid flow in said stripping tower;

a further pump connected to said tower base reservoir for pressure discharging liquid from said tower base reservoir when liquid in said collector reaches said upper liquid level sensor;

a controller mounted on said support base and connected to said pump, to said air blower and to said further pump for selectively energizing said pump, said air blower and said further pump;

an air flow sensor associated with said air blower for providing a signal to said controller when insufficient air flow is provided by said air blower so as to de-energize said pump;

oppositely disposed side enclosure members, said side enclosure members provided with leg means to releasably engage said transverse passageways of said support base; and oppositely disposed end enclosure members attached between opposite of said side enclosure members to enclose said support base to prevent unauthorized access.

2. The system of claim 1 wherein at least one of said end enclosure members is pivotally mounted with respect to one of said side enclosure members.

3. A system for the removal of volatile contaminants from a contaminated liquid containing the same, said system comprising:

a skid-type support base;

a collector mounted on said support base for receiving said contaminated liquid at a first flow rate, said collector provided with an upper and a lower liquid level sensor;

a vertical stripping tower mounted on said support base concentrically with said collector, said stripping tower including a spray head in an upper end, said stripping tower containing internal packing, said stripping tower defining a tower base reservoir for receiving liquid after passing through said stripping tower, said tower base reservoir provided with an outlet proximate a bottom of said tower base reservoir;

a standpipe mounted within said collector, said standpipe having an inlet connected with said outlet of said tower base reservoir, and having an open outlet positioned at an elevation above said upper liquid level sensor whereby excess liquid in said tower base reservoir spills from said open outlet of said standpipe into said collector;

a pump connected to said collector and to said spray head for continuously pumping liquid from said collector to said spray head, when liquid in said collector is above said lower liquid level sensor, at a second flow rate greater than aid first flow rate, whereby liquid in said collector is repeatedly recycled through said stripping tower;

an air blower mounted adjacent said stripping tower and connected to said stripping tower, said air blower providing for air flow upwardly within said striping tower countercurrent to liquid flow in said stripping tower;

a further pump connected to said tower base reservoir for pressure discharging liquid from said tower base reservoir when liquid in said collector reaches said upper liquid level sensor;

a controller mounted on said support base and connected to said pump, to said air blower and to said further pump for selectively energizing said pump, said air blower and said further pump; and an air flow sensor associated with said air blower for providing a signal to said controller when insufficient air flow is provided by said air blower so as to de-energize said pump.

* * * * *